Jan. 28, 1969 T. A. PHILLIPS 3,424,949

HIGH-SPEED OVERLOAD CIRCUIT

Filed May 10, 1966 Sheet 1 of 2

United States Patent Office 3,424,949
Patented Jan. 28, 1969

3,424,949
HIGH-SPEED OVERLOAD CIRCUIT

Thomas Anthony Phillips, Vestal, N.Y., assignor to General Electric Company, a corporation of New York Filed May 10, 1966, Ser. No. 548,975
U.S. Cl. 317—33 4 Claims
Int. Cl. H02h 7/20

This invention relates to improved electronic circuits for limiting currents applied to a load. It is particularly useful for high power applications having semiconductor devices with limited power handling tolerances that require fusing for overload removal within a fraction of a millisecond.

Semiconductor devices are quite susceptible to destructive failure under overload conditions which are commonly analyzed as a function of current squared and time ($i^2t$). While devices having greater power handling capacity can be substituted to provide some increase in overload tolerance, there is a substantial sacrifice in size and cost. Even more important, when there is substantial inductance L in the circuit, particularly with chokes for filtering A-C power, the resulting induced EMF becomes very large because of the basic relationship of $EMF=-Ldi/dt$. In a three-phase 400 Hz. power system where silicon controlled rectifiers (SCR's) are turned OFF by a phase crossing zero voltage, the delay in reaching a zero-crossing can readily exceed 1000$\mu$ sec. With an inductance of 5 mh., for example, this can easily result in a current of more than an order of magnitude greater than normal and therefore cause an $i^2t$ product two orders of magnitude greater than normal. This results in overload currents which are far greater than many devices, such as bridge rectifiers, can be reasonably designed to tolerate.

An existing approach to this type of problem, as described in patent application Ser. No. 359,148, filed Apr. 13, 1964, by Raymond E. Morgan, on "Silicon Control Switch-Saturable Transformer Current Limit Protective Circuit," now U.S. Patent No. 3,320,519, issued May 16, 1967, has been the use of biased saturable reactor transformers to sense load current and to provide overload relief switching circuits responsive to load currents exceeding a selected limit in a time ratio control circuit. This approach can produce very rapid responsive to "fast" surging overloads without substantial power drain in a time ratio control circuit. However, this circuit is not completely satisfactory in the case of a continuous D-C supply where the overload must monitor the load current ind interrupt the line when a certain current is exceeded. For this case it has been discovered that the sensor must detect both "slow" overloads where the threshold current is exceeded at a low rate and "fast" overloads.

It has also been found necessary to provide a line discharge path where there is a large line inductance, as is normally the case with filtered A-C supplies. Not only must the load be disconnected, but the energy in the reactive components must be dissipated without endangering semiconductor devices outside of the disconnected load.

Also, it has been found continuous D-C supplies require protection against gradually built up, or "slow," overloads. In such cases, the transformer sensing overload conditions does not respond with the speed required for proper protection.

Accordingly, it is an object of the invention to provide an overload sensing circuit which responds rapidly to both "fast" and "slow" overload current conditions.

It is a further object of the invention to provide an overload prevention circuit in which line inductances are efficiently discharged.

It is another object of the invention to provide an overload prevention circuit which is largely insensitive to spurious noise signals.

It is a further object of the invention to provide an overload prevention circuit, using very little power which responds to "slow" overloads.

It is another object of the invention to proivde an overload prevention circuit that interrupts the load current in a fraction of a millisecond, which normally requires a response within the time of a power half-cycle.

Briefly stated, an overload prevention circuit is provided which uses a biased saturable transformer to sense load current in an improved manner for performing the fusing function. Novel circuits are provided which respond to both "fast" overloads and "slow" overloads to produce appropriate power disconnect switching signals. While a saturable transformer with a primary winding senses the series load current with an opposing bias source in the secondary determining an overload threshold level as in the Morgan circuits referred to above, it has been discovered that an additional threshold effect can be used to detect slow overloads. Circuitry has been found which detects overload signals (particularly the current ripple) and a threshold device sets a limit, thereby rejecting spurious noise.

It has also been found that the filter chokes can be used with shunt power disconnect switches to discharge the lines. When saturated, the filter chokes provide a low impedance path for rapid discharge of the line current but not so low an impedance as to exceed the disconnect switch current carrying capacity.

The invention, together with further objects and advantages thereof, may best be understood by referring to the following description taken in conjunction with the appended drawings in which like numerals indicate like parts and in which.

Figure 1A:
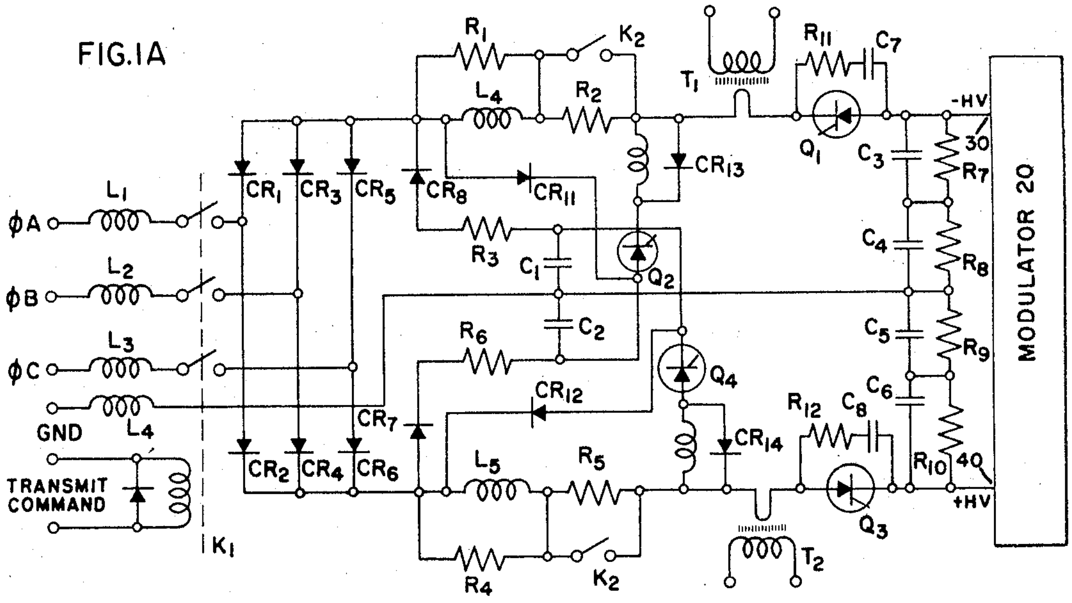
FIGURE 1 is a schematic diagram of a preferred embodiment of the invention applied to a high power pulse modulator.

The FIGURE 1A source of power for the load 20 is a three-phase bridge comprised of rectifiers $CR_1$–$CR_6$ operating directly from the three-phase, 400 cycle lines $\phi$A, $\phi$B, $\phi$C. Each of these lines, as well as the GND or ground line, pass through $\pi$ section radio noise filters having respective inductors $L_1$, $L_2$, $L_3$, and $L_4$. The resultant plus and minus voltage is then filtered by L–C averaging filters and supplied to the load 20 which for this embodiment is a radar modulator. The load receives a series of filtered overlapping half-wave rectified sine current pulses. The filters include capacitors $C_3$–$C_6$ and have voltage equalization resistors $R_7$–$R_{10}$. The remainder of the components are associated with the overload circuit 10. Silicon controlled rectifiers (SCR's) $Q_1$ and $Q_3$ are the series switches; and $Q_2$ and $Q_4$ are turn-off SCR's for power disconnect switching. $T_1$ and $T_2$ are the overload current sensing saturable transformers. $C_1$ and $C_2$ are the respective turn-OFF capacitors for $Q_1$ and $Q_3$ respectively. $CR_8$ and $R_3$, and $CR_7$ and $R_6$ are the respective charging diode and resistor combinations for these turn-OFF capacitors. $R_2$ and $R_5$ are surge limiting resistors and prevent filter capacitors $C_3$–$C_6$ from resonant charging at turn-ON. Relay $K_2$ is activated by a delay circuit operating from the transmit command and shorts out $R_2$ and $R_5$ after a few time-constants of $R_2C_3/2$ from the case of $C_3=C_4=C_5=C_6$. At this time, the filters charge up to the peak of the input voltage, since there is no load on the output until a substantial time after the beginning of a transmit command in this embodiment.

SCR's $Q_1$ and $Q_3$ are pulsed by a gated unijunction transistor oscillator 70 in the overload sense amplifier. The normal sequence of operations is the following:

(1) A transmit command closes relay $K_1$ which connects the three-phase line to the rectifier bridge, and also turns-ON the gated unijunction pulse generator 70 which drives SCR's $Q_1$ and $Q_3$.

(2) The transmit command also starts a surge limiter timer which shorts the surge limiting resistors $R_2$ and $R_5$ after a delay.

(3) After a longer delay, the load 20 is turned-ON, drawing the filter capacitor voltage down. $R_1$ and $R_4$ allow the current in $Q_1$ and $Q_3$ to build up to the holding current before too large a voltage appears across $L_4$ and $L_5$. (Without $R_1$ and $R_4$, the filter draws down until the voltage across $L_4$ and $L_5$ is sufficient to allow current to build up to the holding current. The filters then resonantly charge to twice this difference voltage plus the filter voltage at the instant $Q_1$ and $Q_3$ remain ON. The resulting current spike then trips the overload, disconnecting the load.) In short, $R_1$ and $R_4$ reduce the turn-ON current spike to a tolerable level. When an overload occurs, the sensing saturable transformers $T_1$ and $T_2$ sense the overload current level, triggering the overload pulse generator, which in turn drives SCR's $Q_2$ and $Q_4$ into conduction, thus executing the fusing function. The overload pulse generator also turns OFF the unijunction transistor oscillator 70. Both SCR's $Q_1$ and $Q_3$ are back-biased by the initial voltages on capacitors $C_1$ and $C_2$. $Q_1$ and $Q_3$ turn OFF quite rapidly while the current in the filter and line inductances reverses the charge on capacitors $C_1$ and $C_2$. The voltage on $C_1$ swings from the line voltage to a final voltage of opposite polarity, but resistor $R_3$ acts as a damping resistor preventing charging to higher magnitude voltages. The anode of $Q_3$ is thus held at the same polarity for a time which must be sufficient to allow $Q_3$ to turn OFF. Since there is an initial current in choke $L_5$ and the line inductances, forward blocking voltage is re-applied to $Q_3$ very shortly after the firing of $Q_4$. Thus the series SCR switches $Q_1$ and $Q_3$ must have a short turn-OFF time.

For proper operation of the overload circuit, the overload capacitors must resonantly charge to back-bias and turn-OFF the overload SCR's ($Q_2$ and $Q_4$). Thus, the saturation characteristic of the filter choke is used to advantage; since, as the inductance decreases, the circuit impedance also goes down, and $R_1$ and $R_4$, which have sufficient resistance to damp the unsaturated filter chokes, become insignificant when the chokes $L_4$ and $L_5$ saturate and their impedances are then a small fraction of $R_1$ and $R_4$. When the overload SCR's are triggered, the current in the filter chokes increases, forcing the chokes into saturation, and the overload capacitors charge up. As a result, after $Q_1$ and $Q_3$ turn OFF, $Q_2$ and $Q_4$ also turn OFF but resonantly leave an open circuit for the power source until the overload pulse generator is reset and oscillator 70 turns it ON again.

Figure 1B:
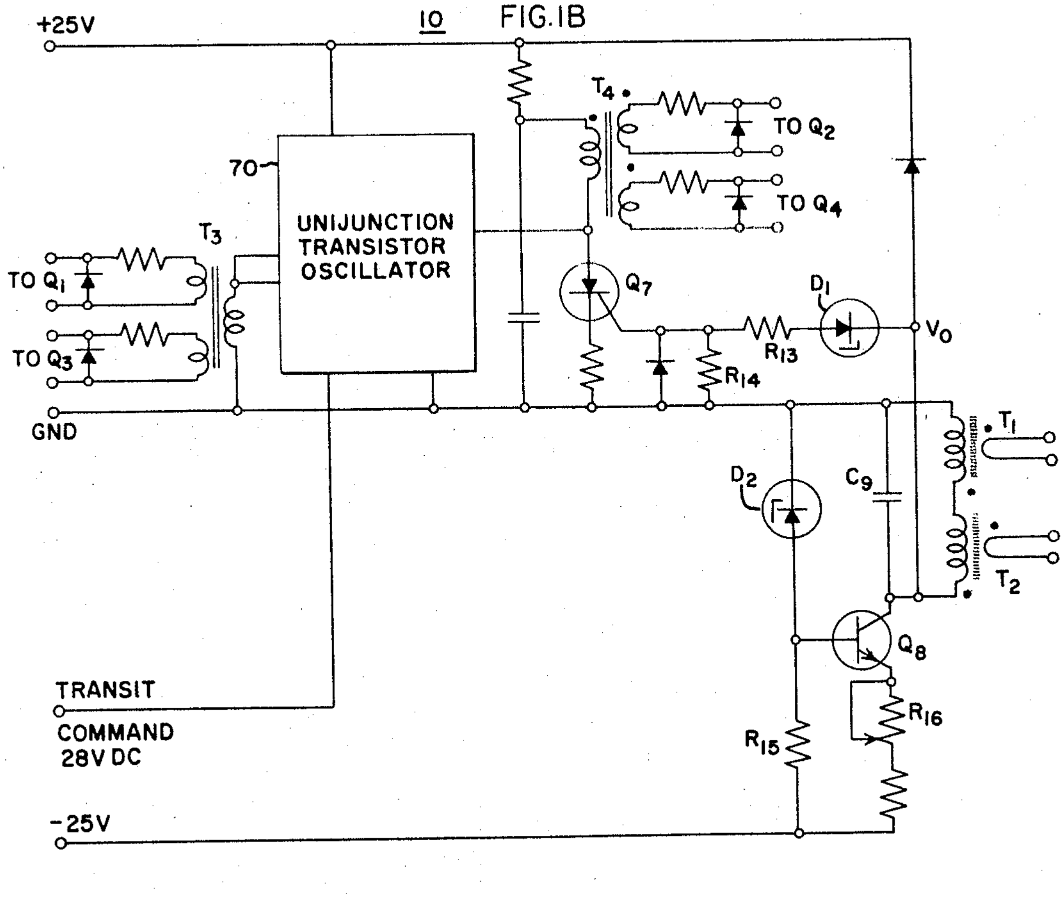

The FIGURE 1B overload sensor uses the pair of saturable current sensing transformers $T_1$ and $T_2$. A bias current produced by transistor $Q_8$ is sent through the secondary windings and, for an ideal square-loop core, no output would appear on the secondary until the primary ampere-turns exceeds the secondary (bias) ampere-turns, thereby producing "excess" current exceeding the bias current and of opposite polarity. At this time, the excess current goes into switching the transformer core and the secondary voltage begins to rise as the distributed capacitance of the current sensing transformer is charged. The secondary voltage will rise to some level which will depend upon the excess drive and the bias circuit impedance. The bias circuit impedance should be as high as possible for maximum sensitivity. If only "fast" overloads (high *di/dt* in the fault condition) were possible, a large choke is all that would be necessary to maintain high impedance.

However, "slow" (low *di/dt* or D-C) overloads are anticipated and so a transistor current source is utilized to maintain high impedance at D-C. A breakdown diode $D_1$ (also called a Zener diode) is utilized for thresholding. This is required since the current transformers have a noise voltage which depends upon the saturated inductance of the transformers and the primary ripple current. (There is also an amplification effect due to the high turns-ratio which is desirable for minimizing the bias current and hence maximizing efficiency.) The L *di/dt* voltage is greatest when the filter chokes $L_4$ and $L_5$ begin to saturate and the ripple current is greatest. The transformer tends to ring because of the distributed capacitance. Thus an integrating capacitor $C_9$ is utilized to "pad" the transformers, lowering the frequency response and minimizing the "hash."

For a "fast" overload, the excess magnetizing current forces the transformers voltage up until the breakdown diode $D_1$ conducts, shunting the excess magnetizing current into the gate resistor $R_{13}$ of the SCR $Q_7$ which then triggers the overload SCR's $Q_2$ ad $Q_4$.

For a "slow" overload, the saturable transformers $T_1$ and $T_2$ act as simple saturable reactors. The bias current and the D-C component of load current form a current balance and at threshold, the power supply ripple current acts as an A-C current source to trigger the overload circuit because of breakdown by diode $D_1$. Without the transistor current source in the bias circuit, the ripple current is effectively short-circuited; that is, the bias circuit impedance is so low that sufficient voltage can not be developed to fire the trigger SCR $Q_7$.

Figure 2A:
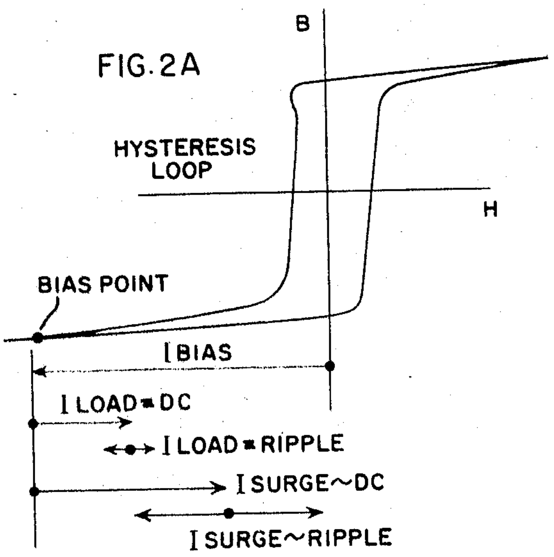
FIGURES 2A and 2B are diagrams illustrating key operating features of the FIGURE 1 circuit and FIGURE 2C shows illustrative waveforms.
Figure 2B:
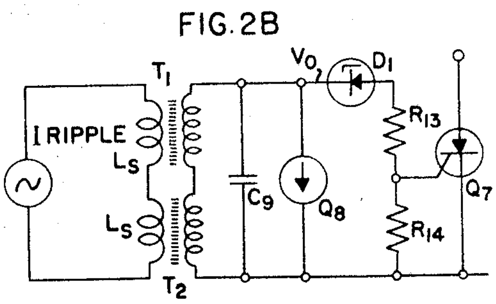
Figure 2C:
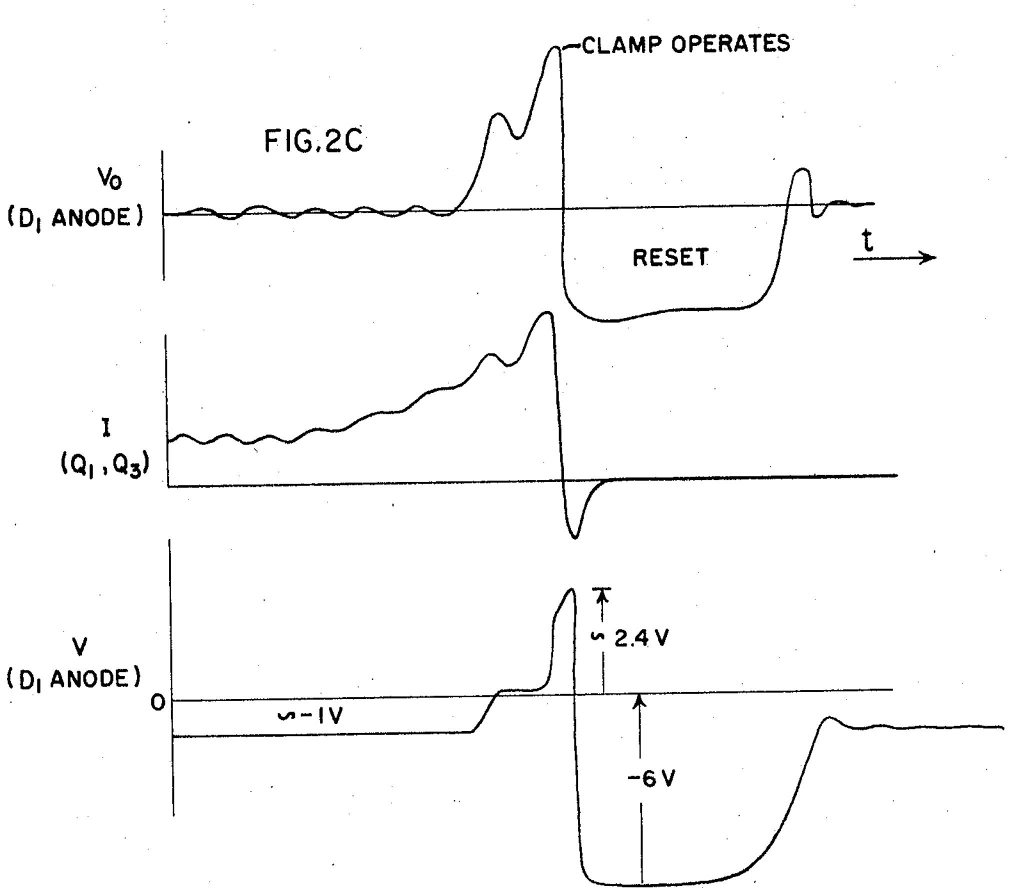

Referring to FIGURES 2A–C, the saturable transformers $T_1$ and $T_2$ are biased into saturation and the load current subtracts from this bias. The saturable transformers act as two winding inductors with a shunt impedance through the bias circuit. The output voltage will then be the product of the A-C component of load current and the total terminating impedance. In the design of the transformers, $L_s$, the saturated inductance or A-C impedance at the bias point, should be minimized to reduce this voltage.

At turn-ON, the surge limit resistors $R_2$ and $R_5$ limit the current spike. However, at this current level, the filter chokes $L_4$ and $L_5$ tend to saturate and ripple current goes up giving a higher "noise" voltage out of the transformers $T_1$ and $T_2$. Another factor is that as the cores tend to come out of saturation, the permeability goes up (*dB/dH* increases), increasing the inductance and hence the noise voltage. To keep this voltage from giving a false trigger, the breakdown diode $D_1$ is included as a threshold device.

In the absence of a voltage threshold, it would be necessary to set the bias current at a high level to prevent the noise voltage or a start-up voltage from triggering the overload circuit. The effect of increasing the bias current is to drive the transformers deeper into saturation, minimizing the saturated inductance. Also, the bias circuit impedance must be reduced to reduce the noise voltage across the transformers. This, of course, means that in order to trigger the overload pulse generator $Q_7$, a high *di/dt* is then necessary either to trigger turn-OFF by a high noise voltage or by exceeding the bias current and switching the core. Therefore, a much longer time and a higher current are required for "slow" overload response than for "fast" overload.

In summarizing the operation of FIGURE 1, $L_4$, $L_5$ and $C_3$–$C_6$ are the filter components for a conventional three-phase bridge rectifier power supply. $Q_1$ and $Q_3$ are series switches to allow rapid interrupt of the line and in the absence of overload remain conducting continuously. The oscillator 70 runs continuously to provide gate excitation to keep the switches ON. An oscillator is used to conserve power since D-C gate excitation would require a floating power supply and additional complexity to tie between the overload sensor and the oscillator. For overload, there are two major threshold effects which originate respectively with the transformer bias source and the breakdown diode $D_1$ respectively. The secondary windings of the saturable transformers $T_1$ and $T_2$, which control the disconnect switching function, respond to a change in flux in the transformer cores. The bias current in the secondary operates in the same manner as a third winding would in driving the cores into saturation. Until the ampere-turns (magnetomotive force) from the primary winding exceeds the ampere-turns from the bias source, there is no significant change in flux and hence no significant induced secondary winding signal. The voltage induced in the secondary winding is proportional to the slope of the hysteresis loop. At the bias point, the slope is very low because of the saturated condition and, thus the effective impedance of the transformer is relatively low.

To suppress spurious noise effects, an integration effect is provided by capacitor $C_9$ (which is augmented by the transformer inter-winding capacitance). As a result, a volt-time integration is required to build up a voltage to break down diode $D_1$. For a "fast" overload, the volt-time integral is reached so rapidly that the time to reach the threshold can be essentially ignored. But for narrow noise spikes, it acts as an effective rejection mechanism. For "slow" overloads, the secondary winding ripple voltage builds up to rapidly cross the threshold for breakdown diode $D_1$.

While the preferred embodiment is applied to a three-phase power source, it is obviously as applicable to a single-phase or any other pulsating source which is applied to a D-C load that requires an efficient and fast fuse function for protecting load components and/or source components, such as bridge rectifiers, from overload currents. SCR's are presently preferred for their good power-handling capacity and relatively low cost. It is contemplated that, in a given application, the invention can employ other devices such as power transistors and silicon controlled switches which have adequate ratings for the particular normal load conditions in conventional A-C to D-C converter circuits. In such circuits, load current would be sensed in the same manner by series-connected saturable-transformer primary-windings, but load disconnect would preferably be performed by turning-OFF the series power switches directly where the power requirements for a turn-OFF control signal are not excessive. Also, variations in the overload circuit are expected, such as different subcircuits for the pulse generator, integrator, or threshold device; for example, using a battery biased diode threshold circuit.

Representative circuit values for the preferred embodiments are as follows:

| | |
|---|---|
| $R_1$ | 360Ω. |
| $R_2$ | 62Ω. |
| $R_3$ | 24KΩ. |
| $R_4$ | 360Ω. |
| $R_5$ | 62Ω. |
| $R_6$ | 24KΩ. |
| $R_7$ | 100KΩ. |
| $R_8$ | 100KΩ. |
| $R_9$ | 100KΩ. |
| $R_{10}$ | 100KΩ. |
| $R_{11}$ | 27Ω. |
| $R_{12}$ | 27Ω. |
| $R_{13}$ | 12KΩ. |
| $R_{15}$ | 7.87KΩ. |
| $R_{16}$ | 5KΩ. |
| $L_1$ | 300 μh. |
| $L_2$ | 300 μh. |
| $L_3$ | 300 μh. |
| $L_4$ | 8.5 mh. |
| $L_5$ | 8.5 mh. |
| $T_1$ | GE106B4077. |
| $T_2$ | GE106B4077. |
| $T_3$ | Aladdin 02–207. |
| $T_4$ | Aladdin 02–207. |
| $C_1$ | 2 μf. |
| $C_2$ | 2 μf. |

| | |
|---|---|
| $C_3$ | 340 μf. |
| $C_4$ | 340 μf. |
| $C_5$ | 340 μf. |
| $C_6$ | 340 μf. |
| $C_7$ | .022 μf. |
| $C_8$ | .022 μf. |
| $C_9$ | .0033 μf. |
| $Q_1$ | C11M. |
| $Q_2$ | ZJ255. |
| $Q_3$ | C11M. |
| $Q_4$ | ZJ255. |
| $Q_7$ | 2N2324A. |
| $Q_8$ | ZN1893. |
| $D_1$ | IN758A. |
| $D_2$ | IN754A. |
| $CR_1$ | IN3191. |
| $CR_2$ | IN3191. |
| $CR_3$ | IN3191. |
| $CR_4$ | IN3191. |
| $CR_5$ | IN3191. |
| $CR_6$ | IN3191. |
| $CR_7$ | IN3190. |
| $CR_8$ | IN3190. |
| $CR_{11}$ | IN3191. |
| $CR_{12}$ | IN3191. |
| $CR_{13}$ | IN3191. |
| $CR_{14}$ | IN3191. |

While particular embodiments of the invention have been shown and described herein, it is not intended that the invention be limited to such disclosure, but that changes and modifications can be made and incorporated within the scope of the claims.

What is claimed is:

1. A high speed overload prevention circuit particularly suited for use with a load supplied by a filtered D-C power signal comprising:

(a) a saturable transformer having a primary winding connected in series with the load for current sensing;

(b) a bias source connected in series with the secondary winding of said saturable transformer so that signals are induced in the secondary winding only when the load current exceeds the level determined by selecting the bias current level;

(c) a signal integrator responsive to signals induced in said secondary winding;

(d) a switching signal generator responsive to said integrator for disconnecting power from the load and thereby perform a fusing function when the load current exceeds the selected level;

(e) a threshold device interposed between said generator and said integrator so as to reject spurious noise signals by passing them through a circuit which shunts said load;

(f) said bias current source being provided by a high impedance source for D-C or slow overloads.

2. The overload prevention circuit of claim 1 further comprising.

(g) a capacitor connected across said transformer secondary winding so as to provide, together with the capacitance of said transformer, said integrator.

3. The overload prevention circuit of claim 2 further comprising:

(h) filter chokes, connected between the power source and said disconnecting switch for providing a current limiting impedance and a resonant turn-OFF source for said switches.

4. An overload circuit comprising:

(a) a rectifier circuit for converting an A-C power signal to a D-C power signal for a load;

(b) a filter for reducing the A-C ripple on said D-C signal;

(c) said filter including a series inductor;

(d) a semiconductor switching element connected for applying power to the load by series switching;

(e) a semiconductor shunt switch connected in parallel with the load for removing power from the load;

(f) a saturable transformer connected to sense, through a series connected primary winding, the current applied to the load;

(g) a high impedance bias current source connected to the secondary winding of said saturable transformer so as to establish a threshold level below which the secondary circuit is substantially insensitive to the primary circuit, thereby setting an overload current level;

(h) a switching circuit responsive to signals in the secondary circuit of said transformer exceeding a selected level to turn-on said shunt switch;

(i) said switching circuit including integrating means for operating said shunt switch when the ripple level persistently exceeds said threshold level;

(j) a surge limit circuit to prevent inadvertent overload tripping due to turn on transients;

(k) a means of exciting the series switches to assure turn on without excessive transients.

References Cited

UNITED STATES PATENTS

| | | | |
|---|---|---|---|
| 3,243,689 | 3/1966 | Perrins | 317—33 X |
| 3,281,638 | 10/1966 | Crawford | 317—33 X |
| 3,319,127 | 5/1967 | Zocholl et al. | 317—36 |
| 3,320,519 | 5/1967 | Morgan | 323—22 |
| 3,329,870 | 7/1967 | Viney et al. | 317—33 X |

JOHN F. COUCH, *Primary Examiner.*

R. V. LUPO, *Assistant Examiner.*

U.S. Cl. X.R.

317—16, 36, 53; 323—22